(12) United States Patent
Sagol

(10) Patent No.: US 7,200,899 B2
(45) Date of Patent: Apr. 10, 2007

(54) METHOD FOR CONNECTING PLASTIC ELEMENTS TO METAL SHEETS AND CONSTRUCTIONS

(75) Inventor: Sami Sagol, Ramat Hasharon (IL)

(73) Assignee: Keter Plastic Ltd., Herzelyia (IL)

( * ) Notice: Subject to any disclaimer, the term of this patent is extended or adjusted under 35 U.S.C. 154(b) by 415 days.

(21) Appl. No.: 10/714,553

(22) Filed: Nov. 17, 2003

(65) Prior Publication Data

US 2005/0103792 A1    May 19, 2005

(51) Int. Cl.
*F16B 5/06* (2006.01)
*B65D 6/16* (2006.01)

(52) U.S. Cl. .............................. 24/295; 24/297; 24/458

(58) Field of Classification Search ................ 24/457, 24/458, 293, 295, 297, 662, 664; 220/642; 403/326, 205, 397; 52/716.6, 716.8, 800.12
See application file for complete search history.

(56) References Cited

U.S. PATENT DOCUMENTS 4,193,172 A * 3/1980 Kanzaka ................. 24/704.1
4,444,321 A * 4/1984 Carlstrom ................... 211/186
5,033,669 A * 7/1991 Federico ................... 229/198.1
5,413,236 A    5/1995 Kenevan
6,213,328 B1    4/2001 Tiramani et al.
6,261,026 B1 * 7/2001 Conley et al. .............. 403/397

FOREIGN PATENT DOCUMENTS

DE    203 13 249 U1    12/2003
GB    682776    11/1952

* cited by examiner

*Primary Examiner*—James R. Brittain
(74) *Attorney, Agent, or Firm*—The Nath Law Group; Jerald L. Meyer; Derek Richmond

(57) ABSTRACT

A coupling is provided between a sheet member with an edge of a thickness T, having at least one opening formed adjacent the edge, and a receiving member formed with a recess of a width W and spacers defining within the recess a groove of a width w, which meets the condition T<w<W. The recess comprises at least one projection protruding into the groove, and the groove is adapted to slidingly receive the edge of the sheet member with the projection snap-fitting into the opening, thereby providing a secure coupling between the sheet and receiving member.

12 Claims, 3 Drawing Sheets

METHOD FOR CONNECTING PLASTIC ELEMENTS TO METAL SHEETS AND CONSTRUCTIONS

FIELD OF THE INVENTION

The present invention relates to couplings effective in connecting together metal sheets and plastic members. The invention further refers to products comprising metal sheets and plastic members securely connected to one another.

BACKGROUND OF THE INVENTION

In many cases it is advantageous to securely and permanently connect metal sheet members with plastic members. Many prior art publications teach, in that respect, the use of pins or screws inserted into cavities in the members that are coupled.

U.S. Pat. No. 6,213,328 refers to a method of coupling a metal sheet to a plastic member formed with sheet receiving grooves. According to U.S. Pat. No. 6,213,328, projections are provided on the surface of the metal sheet, each remaining integrally connected to the metal sheet, and each protruding from the surface thereof and featuring at least one sharp edge. The metal sheet is then inserted into the sheet receiving groove, and engaging the sharp edge to resist retracting the metal sheet from the groove.

SUMMARY OF THE INVENTION

According to one aspect of the present invention, there is provided a coupling between a metal sheet member and a plastic receiving member, in which the metal sheet member has an edge of a thickness T and is provided with an opening, preferably adjacent that edge, and the receiving member is formed with a recess of a width W and spacers defining a groove of a width w within the recess, which meets the condition t<w<W. Said recess comprises at least one projection protruding into the groove.

The groove is adapted to slidingly receive the edge of the sheet member. The projection is adapted to interact with the opening formed in the sheet member to form a snap fit therebetween when the edge of the sheet member is received in the groove.

In accordance with one embodiment of the present invention, the recess is formed with side walls that are thin compared to the width W of the recess, rendering the recess elastic, and the projection is integrally formed with one of the sidewalls, whereby the projection has elastic nature. Such elastic nature can be gained by other designs, e.g. stiff sidewalls with dangling projection and so forth.

The spacers defining the groove are formed integrally with at least one of the sidewalls of the recess and preferably with the sidewall which is opposite the one formed with the projection. The spacers are constructed to be stronger than the sidewalls, to facilitate the rigidity of the recess. Strengthening the spacers may be obtained by many ways, such as forming the spacers with a thicker cross-section compared to the sidewalls, and so on.

Designing the recess with such side walls and spacers enables an easy and cost-effective manufacturing of the receiving plastic member by means of short-cycle injection molding without compromising on its mechanical properties.

The coupling is performed by inserting the edge of the sheet member into the groove, utilizing the elastic nature of the recess, with the projection being pressed out of the groove by the inward advancement of the edge of the sheet member until the projection is aligned with the opening on the sheet member and snap fits in it.

The opening in the sheet member and the projection in the recess have a geometry that prevents withdrawal of the sheet member outwardly from the groove when the projection is snap-fit in the opening. In a preferred embodiment, the projection is formed with a front face, which is the first to contact the edge of the sheet member when inserted into the recess, slanted with respect to the direction of insertion, therefore enabling the edge to easily bias the projection out of the groove. The projection is further formed with a rear face which is perpendicular to the direction of insertion, so that when the projection is snap-fit in the opening, it interacts with the opening to prevent withdrawal of the sheet member out of the groove.

The opening in the sheet member may be an aperture spaced from, or it may be positioned at the edge of the metal sheet member, and it may have any other shape adapted to collaborate with the projection to create a secure snap-fit connection.

Due to the fact that the connection between the sheet member and the receiving member according to the present invention, does not involve ongoing pressure between the two coupled members, no internal stresses are developed in either of them, therefore causing no danger of disconnection of the coupling as a result of creep or yield in one of the members.

In accordance with another aspect of the present invention, there is provided a product comprising a U-shaped base made of a metal sheet, two plastic rulers, two plastic end walls and, possibly, a cover, where the base is connected to the plastic rulers and plastic end walls essentially in accordance with the first aspect of the present invention.

The use in the product of the present invention, of base in the form of a metal sheet, is advantageous since such sheet may be produced by the process of cold pressing, which is known to be fast, easy and low cost.

The U-shaped base has a couple of essentially straight side edges, and a couple of U-shaped end edges, with at least one opening formed adjacent each of said edges.

Both the plastic rulers and the plastic end walls of the toolbox are formed with recesses adapted to slidingly receive one of the edges of the base, the recesses in the plastic rulers being adapted to receive the side edges of the base and the recesses in the end walls being adapted to receive the end edges of the base essentially as in the coupling according to the first aspect of the present invention.

The plastic rulers are further provided with two ends, and the plastic end walls are formed with two sockets. The ends of the rulers are adapted to fit into the sockets of the plastic end walls upon the assembly of the toolbox, thereby providing a secure connection therebetween.

Assembling the product of the present invention can be easily and quickly performed by the steps of: securing the two plastic rulers to the side edges of the U-shaped base and then securing said two end walls to the end edges of the base, while coupling the sockets in the end walls to the ends of the plastic.

Both the plastic rulers and the plastic end walls may be easily and with no extra cost, designed to receive a cover, which can be readily added to the assembly with relatively little cost.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

A coupling 10 between a metal sheet member 20 and a plastic receiving member 30, according to the present invention, will be explained with reference to FIGS. 1 and 2 and, particularly, FIGS. 3A, 3B and 3C, which illustrate in detail the coupling process based on the insertion of the sheet 20 into the receiving member 30 in the direction of insertion I.

Figure 1:
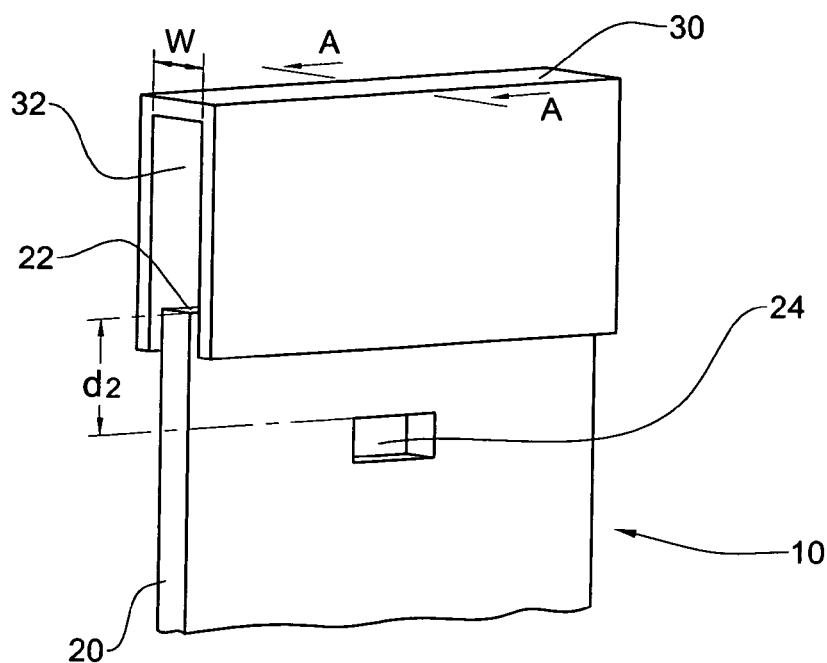
FIG. 1 is a general view of the two members of the coupling.
Figure 2:
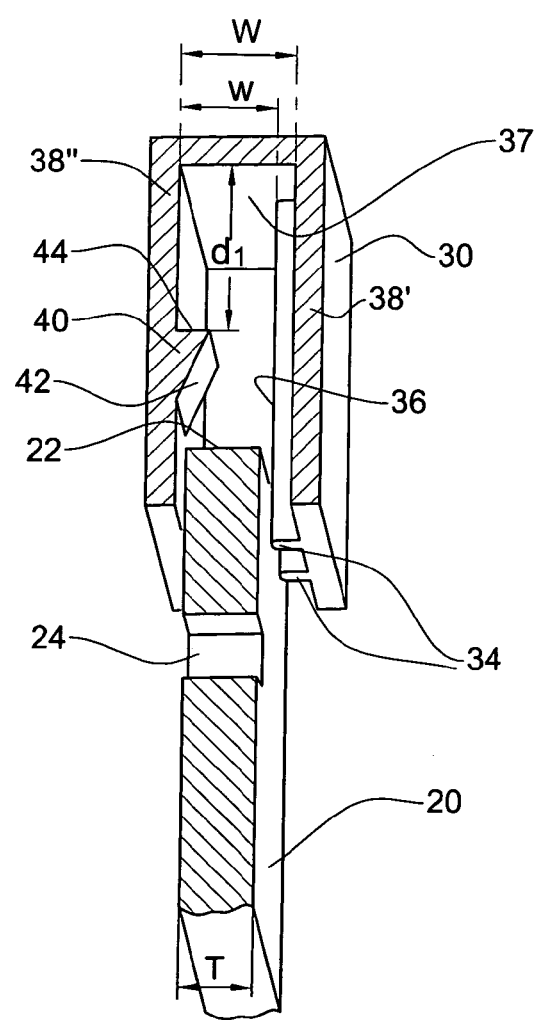
FIG. 2 is a cross-section view of the coupling members shown in FIG. 1.

Referring to FIGS. 1 and 2, the metal sheet member 20 has an edge 22 of a thickness T and is formed with an aperture 24 in a distance d2 from the edge 22. The receiving member 30 is formed with a recess 32 of a width W having a bottom 37 and side walls 38' and 38", that are thin compared to the width W of the recess, providing it with elasticity.

The recess 32 is further provided with spacers 34 formed integrally with one of the sidewalls thereof, for instance first side wall 38'. The spacers have a thicker cross section than the sidewalls, and are therefore stronger than the side walls and facilitate the rigidity of the recess. The spacers 34 define, with the second side wall 38", a groove 36 of a width w, which meets the condition T<w<W.

The recess 32 further comprises at least one projection 40 protruding into the groove 36, integrally formed with the second side wall 38". The projection has a front face 42 slanted with respect to the direction of insertion I and a rear face 44 perpendicular to the direction I. The projection 40 is located on the side wall 38" at a distance d1 from the bottom 37 of the recess 32, wherein d1 is equal to or greater than the distance d2 between the aperture 24 in the metal sheet member 20 and its edge 22.

Figure 3C:
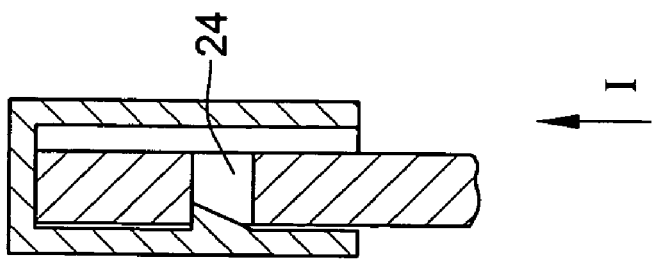
FIGS. 3A, 3B and 3C are schematic views of the coupling process of the coupling members shown in FIG. 2.
Figure 3B:
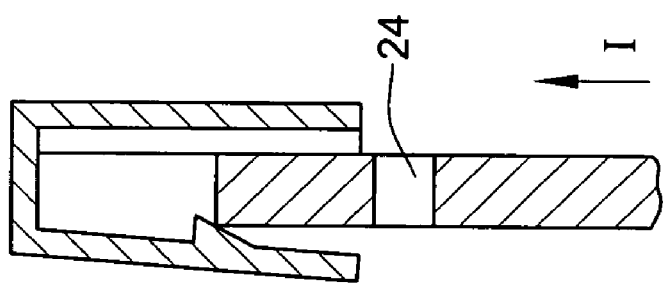
Figure 3A:
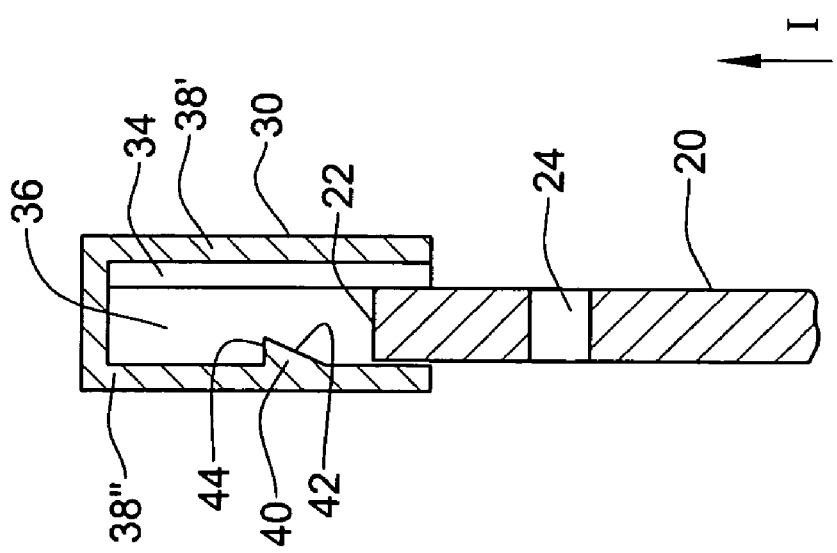

The coupling between the sheet and the receiving member is obtained by the insertion of the edge 22 of the metal sheet member 20 into the groove 36 in the direction I as shown in FIGS. 3A, 3B and 3C.

The groove 36 in the receiving member 30 is slidingly receiving the edge 22 of the metal sheet member 20 with the projection 40 snap-fitting in the aperture 24 therein, thereby providing a secure coupling between the sheet member 20 and the receiving member 30.

When the edge 22 of the sheet member 20 is inserted into the groove 36, the projection is pressed out of the groove, thanks to the elastic properties of the side walls 38' and 38" and thanks to the slanted front face 42, as shown in FIG. 3B. The advance of the edge 22 is enabled to the point where the aperture 24 is aligned with the projection 40 so that the projection snap-fit in the aperture as shown in FIG. 3C. The rear face 44 being perpendicular to the direction I is interacting with the aperture to prevent withdrawal of the sheet member out of the groove in a direction opposite to I. Therefore a secure and durable connection is provided as shown in FIG. 3C.

The coupling of the present invention may have a plurality of applications and may be used in the production of different products. One such product is a container that has to be rigid and durable and, at the same time, lightweight and low-cost.

Figure 4:
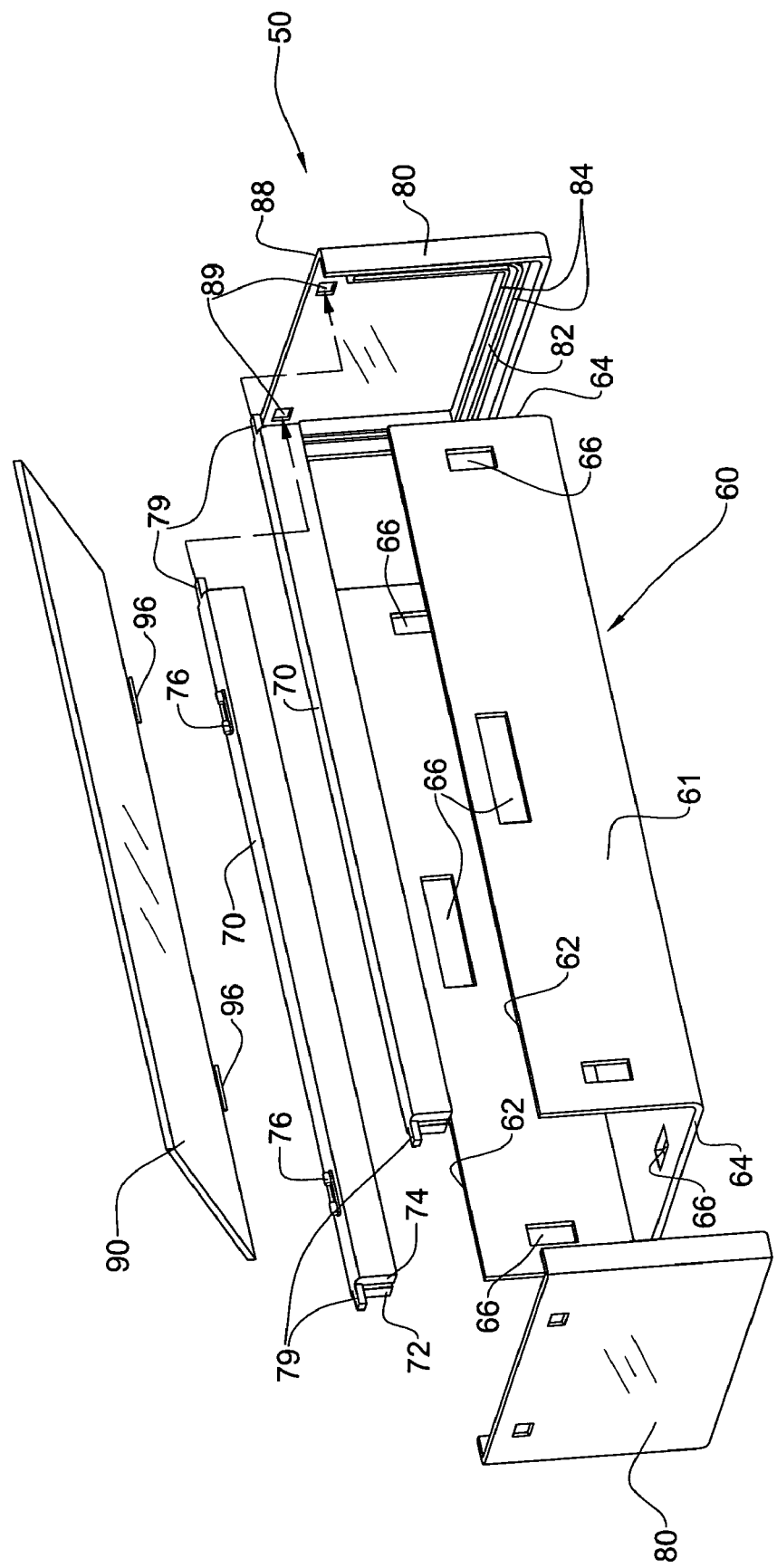
FIG. 4 is an exploded view of a product assembled using a coupling of the present invention.

FIG. 4 illustrates a container 50 comprising a U-shaped base 60 made of a metal sheet 61 of a thickness t two plastic rulers 70, two plastic end walls 80 and a cover 90.

The U-shaped base 60 has a couple of essentially straight side edges 62, and a couple of U-shaped end edges 64. At least one opening, preferably an aperture, 66 is formed in the base 60, adjacent each of its four edges.

The plastic rulers 70 are formed with recesses 72 of a width w, greater than the width t of the edge of the base 60, defined by sidewalls 74 and designed in the same manner as the recess 32 in FIGS. 1 to 3. Recesses 72 are adapted to slidingly receive side edges 62.

Similarly, the end walls 80 are formed with recesses 82 bound by sidewalls 84, adapted to slidingly receive the end edges 64 of the base 60.

In addition, the plastic rulers 70 are provided with two ends 79, and the end walls 80 are formed with two corresponding sockets 89. The ends 79 are adapted to fit into the sockets 89 upon the assembly of the toolbox 50, thereby providing a secure connection therebetween.

Assembling the container comprises the steps of: securing the two plastic rulers 70 to the side edges 62 and then securing the two end walls 80 to the couple of end edges 64, thereby coupling the sockets 89 in the end walls to the ends 79 in the plastic rulers to form the container 50, by using the principles of the coupling with reference to FIGS. 1 to 3.

A cover 90 is added to the container 50. Designing the container 50 with side rulers 70 and end walls 80 produced by injection molding, enables forming these parts in a design that facilitate the acceptance of the cover 90 simply and with no extra cost.

What is claimed is:

1. A coupling between a sheet member with an edge of a thickness T, having at least one opening formed adjacent said edge, and between a receiving member formed with a recess of a width W and spacers formed on a first sidewall of the recess, said spacers defining within said recess a groove of a width w, wherein said thickness T, said width W and said width w meet the condition T<w<W, said recess comprising also at least one projection formed on a second sidewall of the recess, said second sidewall being opposite to the first sidewall, said projection protruding into said groove, wherein said spacers facilitate rigidity of the recess and the arrangement being such that when said sheet member is advanced inwardly into said groove it is slidingly received therein and said projection is pressed out of the groove until the opening is aligned with the projection to allow snap-fitting of the projection into said opening, thereby providing a secure coupling between the sheet member and the receiving member.

2. A coupling in accordance with claim 1, wherein said sheet member is made of a metal.

3. A coupling in accordance with claim 1, wherein said receiving member is made of a thermoplastic polymer.

4. A coupling in accordance with claim 1, wherein said projection is configured for being elastically pressed out of the groove, enabling said sheet member, during its insertion into said recess, to advance in an inward direction thereof into said groove until said opening is aligned with the projection to enable the projection snap-fit into the opening.

5. A coupling in accordance with claim 4, wherein the opening in said sheet member and said projection have a geometry that prevents withdrawal of the sheet member outwardly from the groove when the projection is snap-fit in the opening.

6. A coupling in accordance with claim 5, wherein said projection is formed with a front face, adapted to be the first face to contact said edge of the sheet member when the sheet member is inserted into the groove, and a rear face, wherein said front face is slanted with respect to the inward direction, enabling the front edge to easily bias the projection out of the groove, when inserting the sheet member into the groove, and wherein said rear face is perpendicular to the inward direction, so that when the projection is snap-fit in the opening, it prevents withdrawal of the sheet member out of the groove.

7. A coupling in accordance with claim 6, wherein said recess is formed with sidewalls providing it with elasticity, and wherein said projection is integrally formed with one of said sidewalls.

8. A coupling in accordance with claim 3, wherein said recess in said receiving member is designed with sidewalls of a uniform wall-thickness.

9. A coupling in accordance with claim 8, wherein the sidewalls of said recess, are thin compared to the width W of the recess.

10. A coupling in accordance with claim 9, wherein said spacers are formed integrally with at least one of said sidewalls.

11. A coupling in accordance with claim 10, wherein said spacers are configured to be stronger than said sidewalls, facilitating the rigidity of the recess.

12. A coupling in accordance with claim 1, wherein said opening is an aperture spaced from the edge.

* * * * *